Feb. 16, 1926.
E. POHL
1,573,571
TABLE FOR X-RAY TRANSRADIATION
Filed May 20, 1924  7 Sheets-Sheet 1
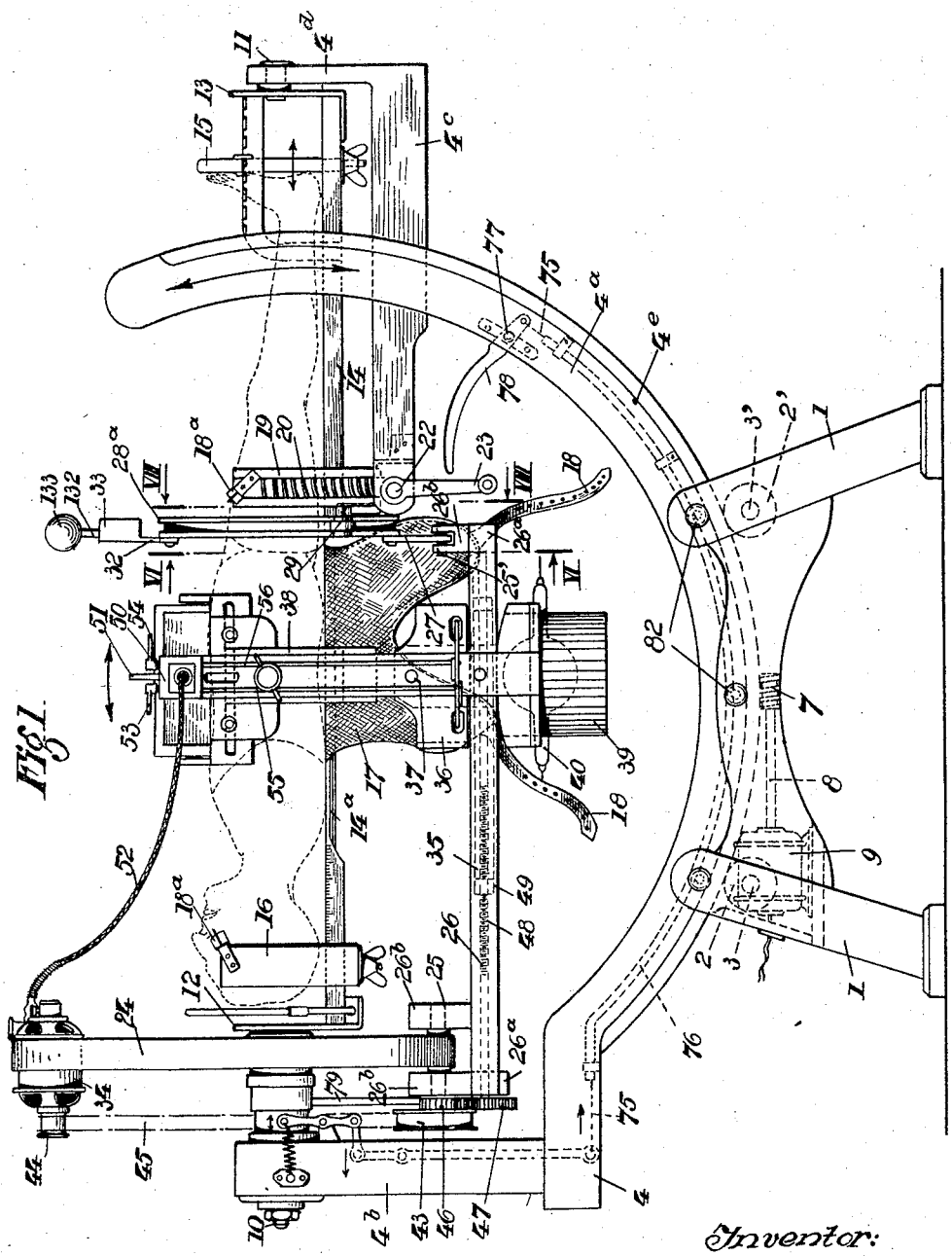
Inventor:
Ernst Pohl.
By his Atty,
Harold D. Penney

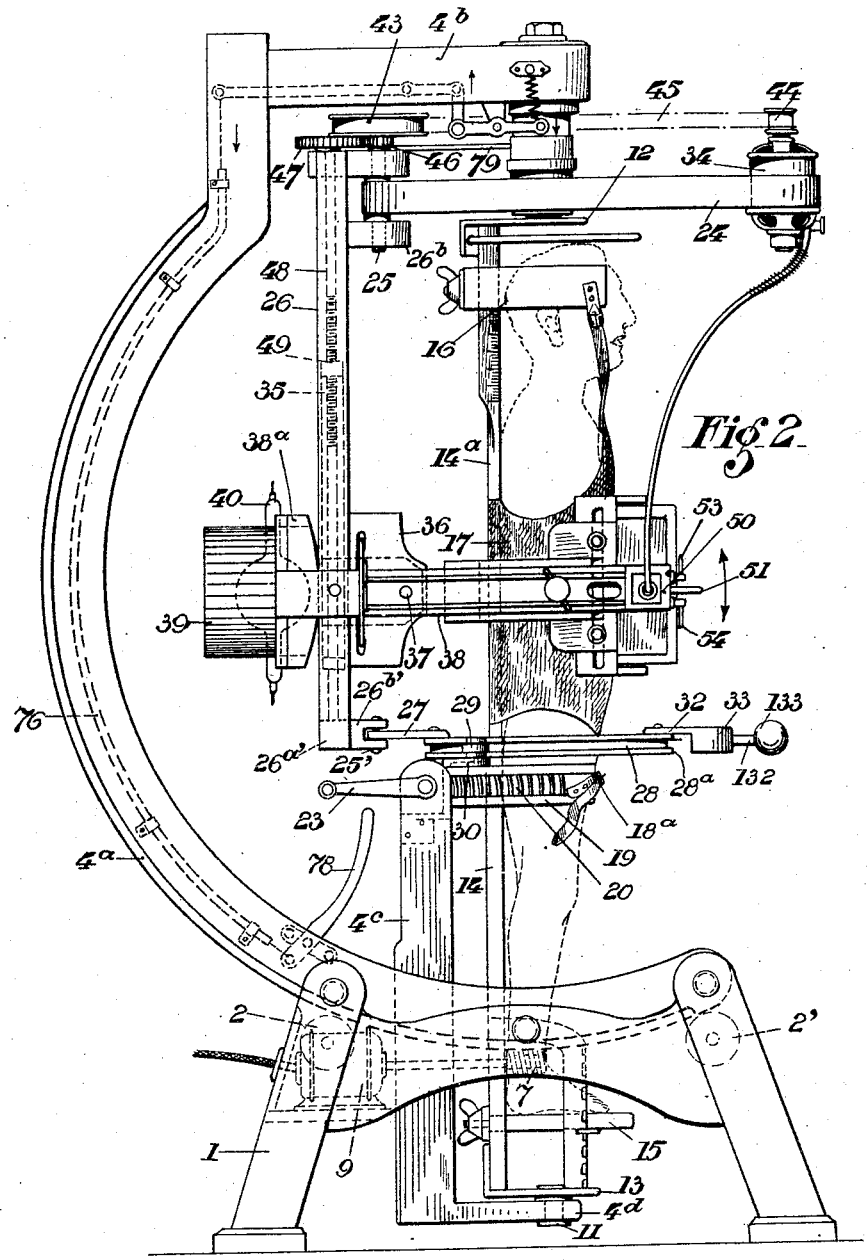

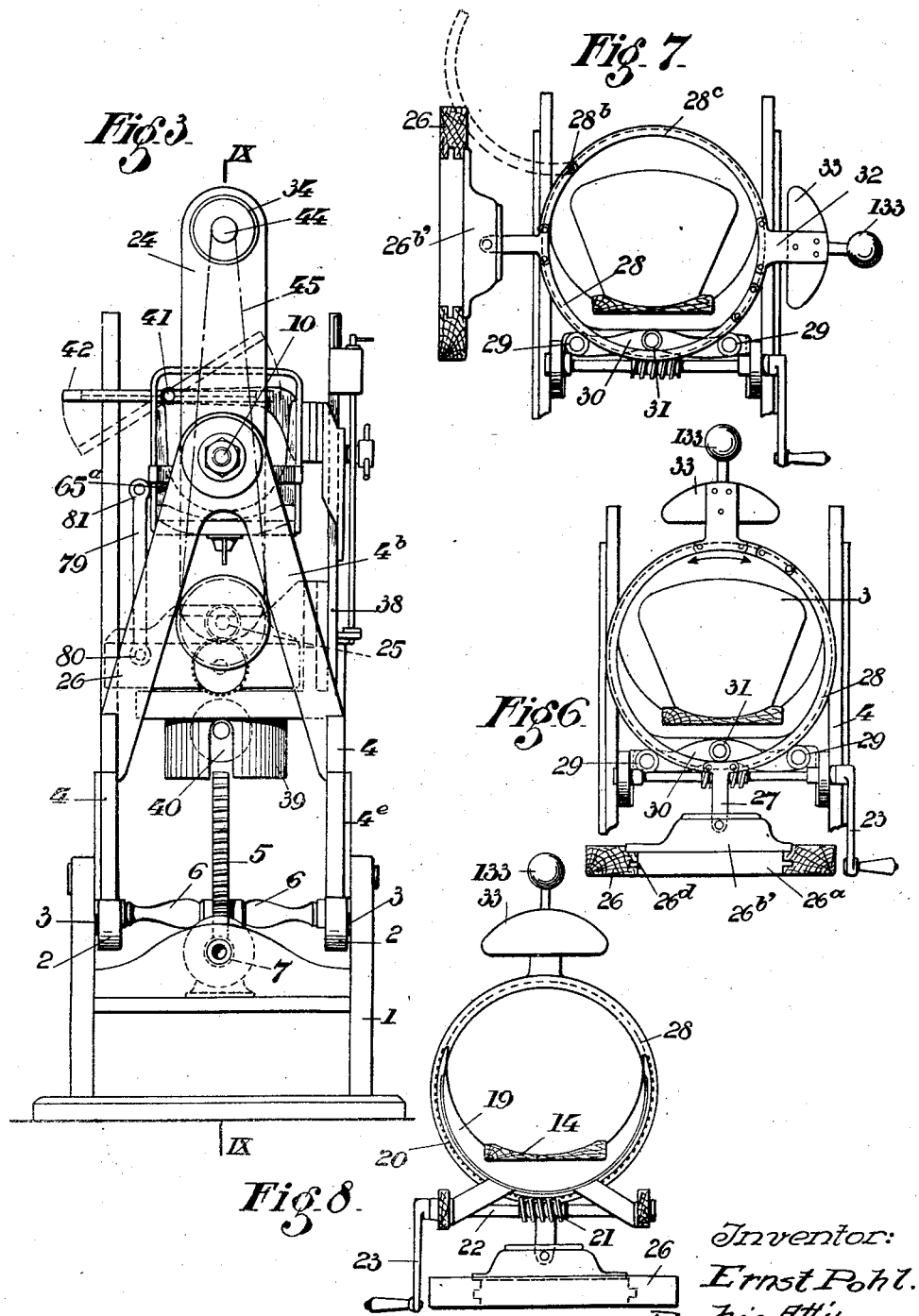

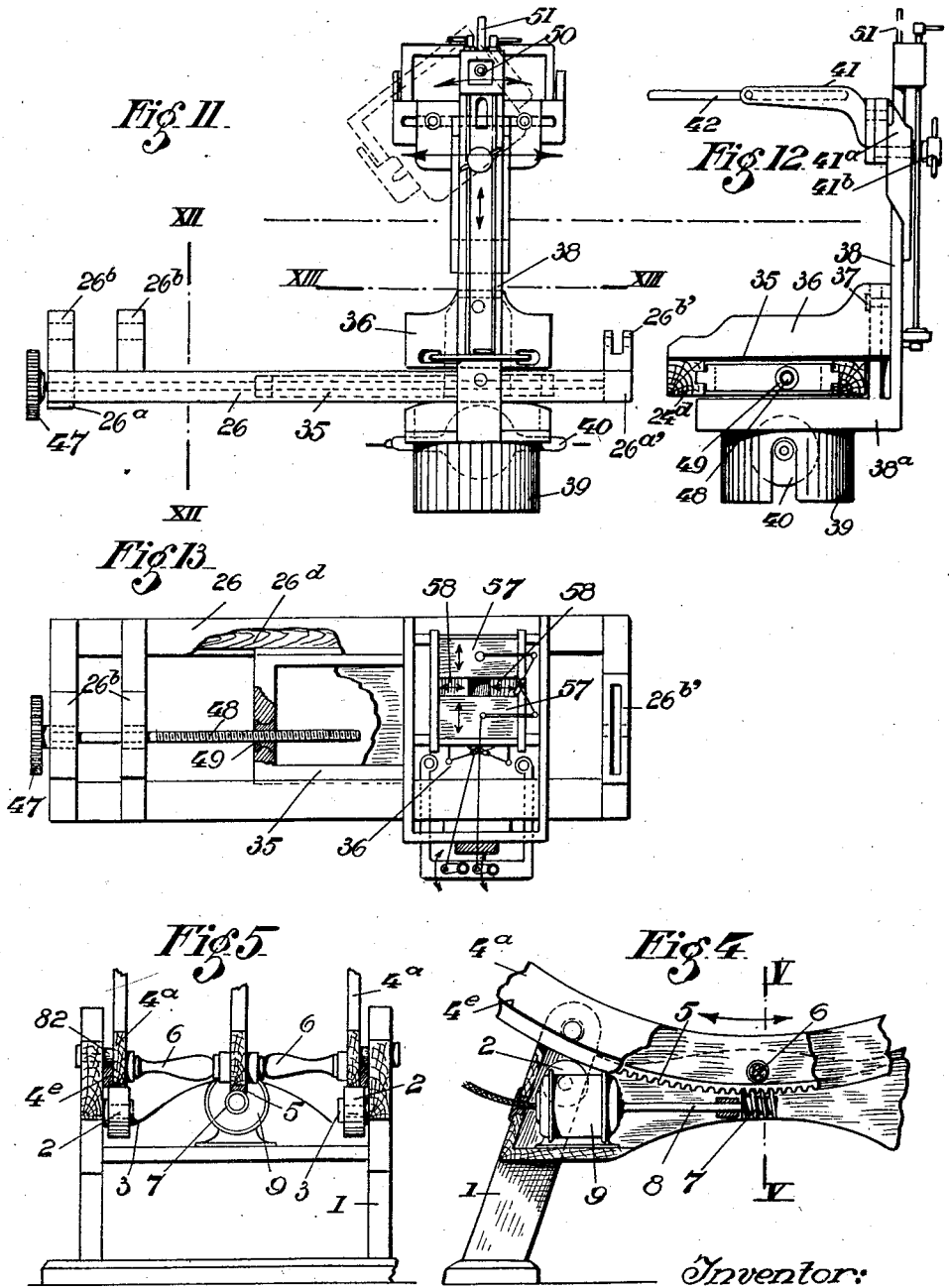

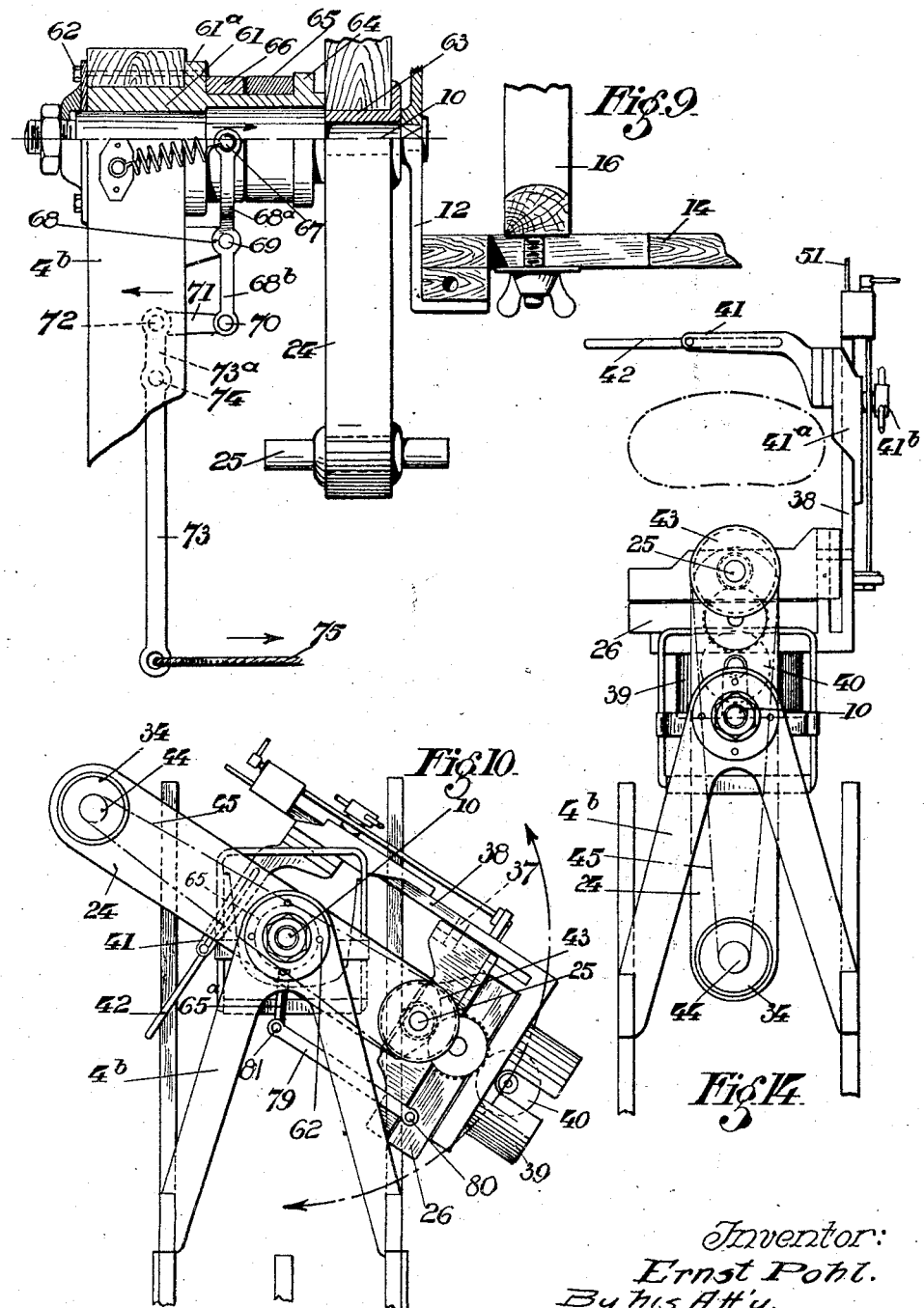

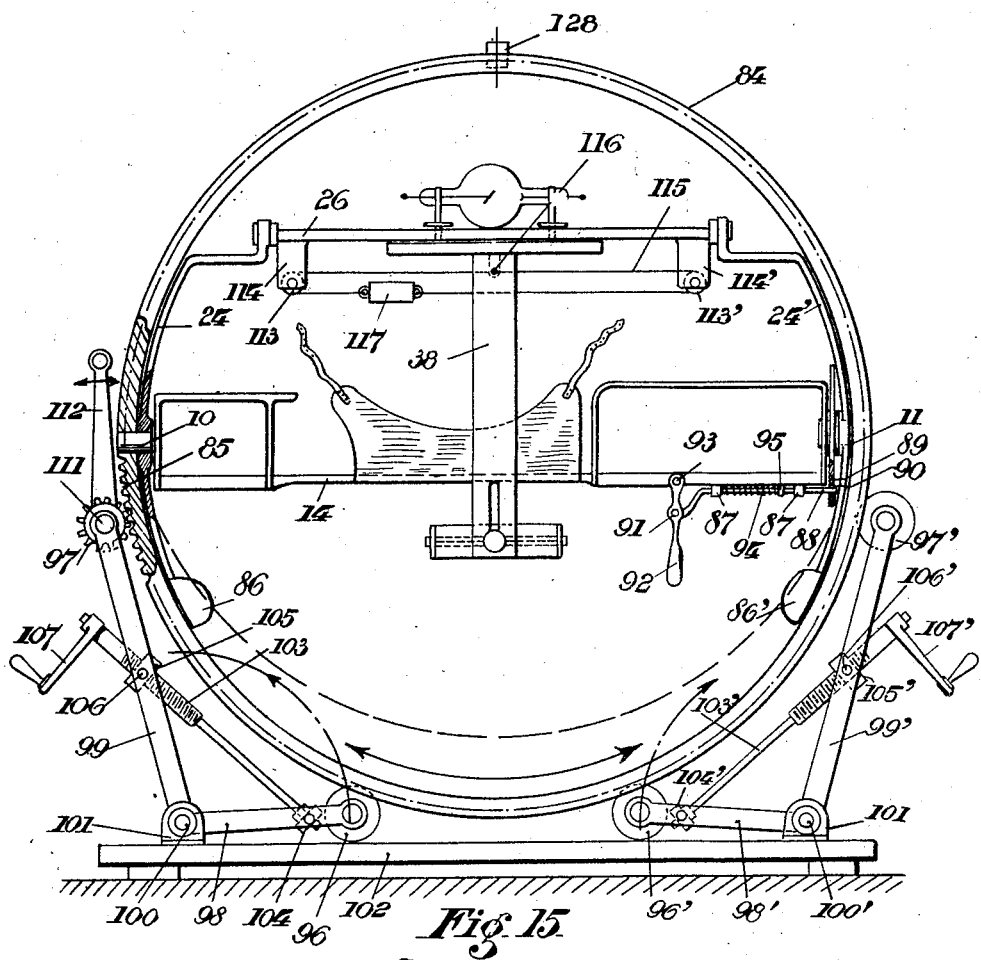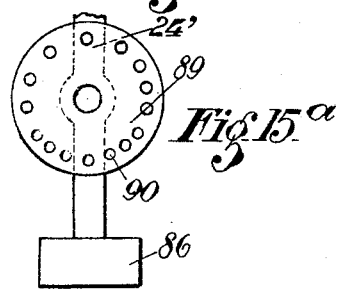

Feb. 16, 1926.                                                1,573,571
E. POHL
TABLE FOR X-RAY TRANSRADIATION
Filed May 20, 1924          7 Sheets-Sheet 7
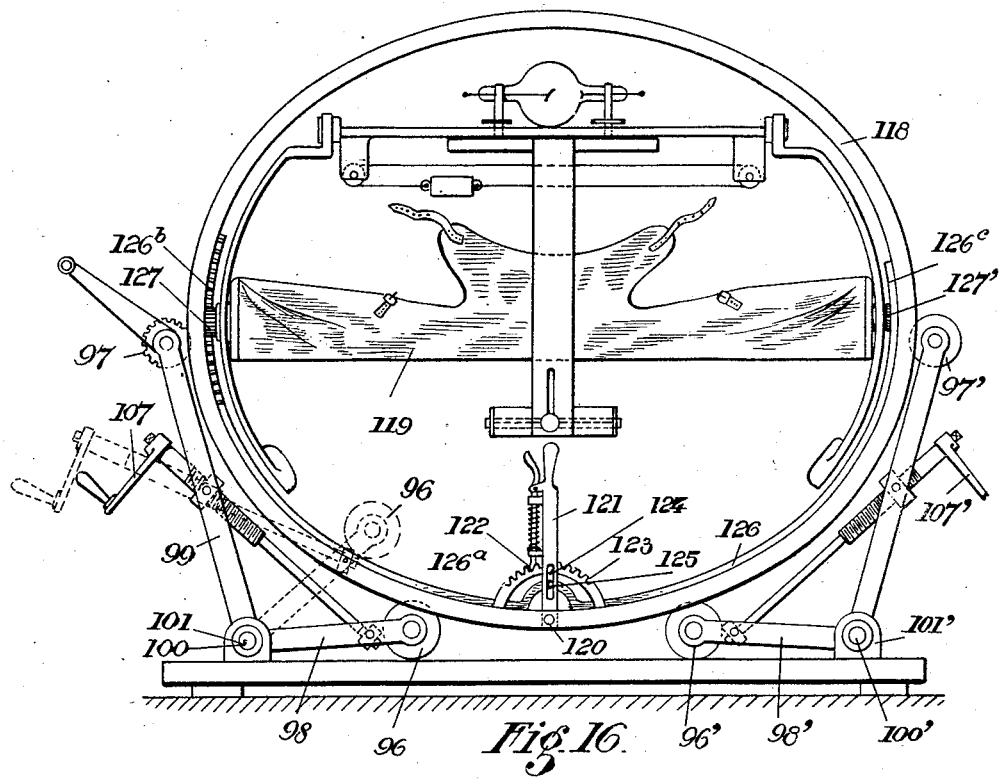
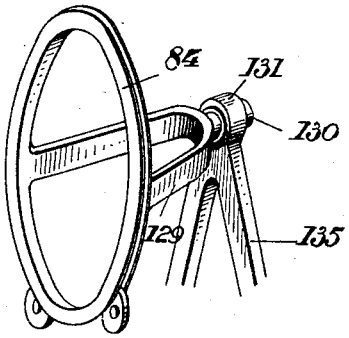
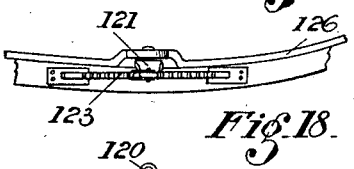
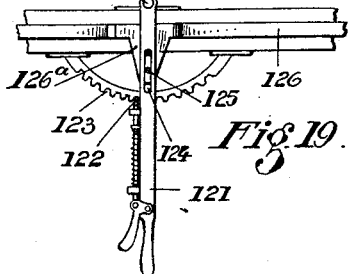
Inventor:
Ernst Pohl.
By his Att'y,
Harold D. Penney Patented Feb. 16, 1926.

1,573,571

UNITED STATES PATENT OFFICE.

ERNST POHL, OF KIEL, GERMANY.

TABLE FOR X-RAY TRANSRADIATION.

Application filed May 20, 1924. Serial No. 714,599.

*To all whom it may concern:*

Be it known that I, ERNST POHL, a citizen of the German Republic, residing at Kiel, Germany, have invented certain new and useful Improvements in Tables for X-Ray Transradiation (for which I have filed applications in Germany April 4, 1921, Feb. 21, 1922, March 23, 1923, and in Great Britain, March 28, 1924), of which the following is a specification.

The subject of this invention is a rotatable bed for X-ray transradiation, in which a table, board or the like, on which the patient rests, is supported by means of a universal joint, being for instance rotatable about a longitudinal axis, for the purpose of giving it any required lateral inclination, and in which the longitudinal axis is journalled in a frame, which itself is capable of rotating about a transverse axis in a fixed frame, for the purpose of enabling the table or the like to be adjusted in any position with its longitudinal axis.

The object of the invention is to construct an apparatus of this kind in such a manner that the transradiating means (slide, screen, X-ray tube) may be applied as conveniently as possible and from as many sides as possible. For this purpose the table or the like is so mounted in the longitudinal direction that it can be tilted, all parts of the body being completely accessible at least from one side. This can be effected in various ways. According to one way curved guiding means are provided for tilting in the longitudinal direction, which have the form of a complete annulus or a portion of an annulus, either by themselves, in which case the patient is accessible from both sides, or in combination with a pivotal bearing on one side by means of a substantially horizontal forked member, which, when made sufficiently strong, is capable of supporting the table alone.

A further considerable improvement consists in this that the X-ray tube and the slide or screen are so mounted that they can be passed partly or completely round the body of the patient and exposures or observations made on the screen in all directions. This arrangement is made possible by the particular way of mounting the table, as there is sufficient room between the table and the frame, in which it is mounted for the passage of the said transradiating means.

Various constructional forms of the improved rotatable bed are shown in the drawings.

Fig. 1 shows a complete rotatable bed in side elevation, the table being set horizontally.

Fig. 2 is a similar view with the table in the vertical position.

Fig. 3 is an end view from the left hand side of Fig. 1.

Fig. 4 shows in detail the driving means for tilting the table about its transverse axis.

Fig. 5 is a section on line V—V of Fig. 4,

Fig. 6 is a section on line VI—VI of Fig. 1,

Fig. 7 is a similar section with the tube and screen holder turned through 90°,

Fig. 8 is a section on line VIII—VIII of Fig. 1,

Fig. 9 is an enlarged view partly in longitudinal section on line IX—IX of Fig. 3 of an arrangement for fixing a portion of the mechanism for moving the tube and screen holder, Fig. 10 is a fragment of the end view shown in Fig. 3 with the tube and screen holder in an oblique position, Fig. 11 shows the tube and screen holder in detail as seen from the side, Fig. 12 is a corresponding end view in section on line XII—XII of Fig. 11, Fig. 13 is a section on line XIII—XIII of Fig. 11 with some of the details in partial section, Fig. 14 is a partial view of the apparatus from above with the table set vertically and the tube and screen holder in a special position, Fig. 15 shows another constructional form of the rotatable bed in side elevation with parts in section, Fig. 15ª shows a detail thereof.

Fig. 16 is a side elevation of a further constructional form.

Fig. 17 is a diagrammatic perspective view of a further constructional form of the couch support and its bearing parts.

Figs. 18 and 19 show a side elevation and top view respectively of a modified detail of the construction shown in Fig. 16.

In the apparatus, as shown in Figs. 1–14, 1 is a cradle, on both sides of which supporting rollers 2 and 2′ are mounted on axles 3, 3′. These rollers support a frame 4 consisting of two frame members 4ª, which lie one at each end and are bent over the greater part of their length into the arc of a circle, a bearing pedestal 4ᵇ at one end and a bracket 4ᶜ at the other end supporting a bearing 4ᵈ.

Centrally between the frame members 4ᵃ a rack 5 is provided, which is also bent in the arc of a circle about the same centre and is supported by the frame members by means of transverse connecting members 6. The rack meshes with a worm 7, which is mounted on a shaft 8 journalled in the cradle 1, which shaft is driven by an electric motor 9, also mounted in the cradle. By this means the frame 4 may be turned about the centre of curvature of the frame members 4ᵃ, as may be seen from Figs. 1 and 2. On the outer sides of the frame members 4ᵃ ribs 4ᵉ are provided, on which rest the guide rollers 82, so that the frame members are guided between the rollers 2, 2′ and 82 in such a manner that they cannot fall off the cradle 1.

In the bearings 4ᵇ and 4ᵈ gudgeons 10 and 11 are journalled, which by means of angle-shaped supporting members 12 and 13 support a table 14, on which the patient lies. This table is made concave in the transverse direction, so as to adapt itself to the shape of the body and is reduced at 14ᵃ, where the upper part of the patient's body rests, so as to allow the X-rays to pass through more readily. In the neighborhood of the gudgeon 11 on the table an adjustable foot-rest 15 is provided and at the other end an adjustable, curved head-rest 16. The table is also provided with a broad girth 17 for fastening round the body of the patient for holding it on the table. At both ends of the girth two straps 18 are sewn on obliquely. There is further attached to the table 14 a dished or curved part 19, on the periphery of which is a rack 20, which meshes with a worm 21 on a shaft 22, which is journalled in the bracket 4ᶜ of the frame 4 and at one end of which is a crank 23. By means of the crank the table 14 can be turned about the gudgeon pins 10 and 11. At both ends of the part 19 and at the ends of the two limbs of the head-support 16 buckles 18ᵃ are provided. To these buckles and straps 18 are attached cross-wise.

On the gudgeon pin 10 and adjacent to the bearing 12 for the table 14 a double arm 24 is mounted, so as to turn freely, one end of which supports a guide 26 by means of a pin 25 on projecting parts 26ᵇ. This guide consists of a frame formed by two lateral guiding members, which are connected by means of transverse parts 26ᵃ, 26ᵃ′ at the ends. At the other end the guide is suspended from a hanger 26ᵇ′ on the transverse part 26ᵃ′ by means of a supporting arm 27 and a ring 28, which passes completely around the table 14 and the diameter of which is sufficiently large so as to provide room for the body of the patient. The ring is provided with externally extending flanges 28ᵃ, between which a groove is formed. In this groove engage two supporting rollers 29 mounted at either side, which are rotatably mounted on an intermediate part 30, which connects the two lateral parts of the bracket 4ᶜ. Between these rollers a further roller 31 rests against the inner surface of the ring 28, which latter roller is also mounted on the connecting part 30. The ring is thus guided between the three rollers 29 and 31 in such a manner that the said ring can turn completely about its axis. Diametrically opposite the arm 27 an arm 32 is provided on the ring with a counterpoise 33, to which is attached by means of a bar 132 a ball handle 133, which acts as an additional counterpoise. At the free end of the arm 24 is mounted an electric motor 34, which also acts as a counterpoise. The weights 33, 133 and 34 counterbalance the weight of the guide 26, together with the parts guided thereon. By taking hold of the handle 133, the ring 28 with the guide 26 and the arm 24 may be turned together about the axis of the gudgeon pins 10, 11, so that the guide 26 is turned about the middle of the body of the patient lying on the table 14. In the guide 26, the sides of which are provided internally with grooves 26ᵈ (Figs. 12 and 13) a slide 35 is slidably mounted, which supports a bearing 36. In this bearing is mounted laterally by means of a pin 37 a double arm 38, one part of which supports on a bracket 38ᵃ extending towards the middle of the guide, a box 39 for the reception of the tube 40, while the other part supports on a sliding piece 41ᵃ, adapted to be fixed by a clamping screw 41ᵇ, a bracket 41, on which the screen 42 or a slide can be mounted. Owing to the manner in which the arm 38 is mounted on the pin 37, the tube and the screen can be set obliquely with respect to the axis of the body of the patient, so that it is possible to pass the rays through the body in a direction inclined to the longitudinal axis.

On the end of the stub shaft 25 a belt pulley 43 is mounted, which is connected by a belt 45 to a belt pulley 44 on the shaft of the electric motor 34. Next to the belt pulley 43 and fixed to it is a toothed wheel 46, with which meshes a toothed wheel 47 on a screw spindle 48 mounted longitudinally in the guide. The screw spindle 48 screws into a nut 49 on the slide 35. By this means it is possible to cause the motor 44 to displace the tube box and the screen holder in the longitudinal direction of the patient lying on the table 14, so that the rays can pass through any part of the upper part of the body.

For causing the motor 34 to run in the clockwise and counter-clockwise direction, a reversing switch 50 is provided on the end of the arm 38, which switch is so constructed and so connected to the motor through wires in the cable 52 that a pressure to the left on the controlling lever 51 will cause a displacement to the left and a pressure to the right will cause a displacement to the right. To the right and left of the controlling lever 51 handles 53 and 54 are provided, from which shafts 55 and 56 lead to the bearing 36 for adjusting the diaphragm by means of the lever mechanism shown in Fig. 13, which diaphragm according to the drawing consists of two crossing pairs of parallel sliding parts 57 and 58.

The ring 28, as will be seen from Fig. 7, is provided with a hinged part $28^c$, which is rotatable about a pin $28^b$. The ring 28 can thus be opened for making it easier for the patient to get on to the table.

As already stated, the table 14 is journalled at the head end by means of a pin 10 fixed to the support 12. This pin is free to rotate in the bearing $4^b$, which is provided for the reception of the pin with a bush 61 extending to the arm 24, which bush is fixed to the bearing by means of a flange $61^a$ and screws 62. The arm 24 is provided with a bush 63, which is loosely mounted on the inner end of the pin 10 immediately next to the support 12. Between the bearing $4^b$ and the arm 24 a collar 64 is fixed to the bush 61. Adjacent to the collar a ring 65 having an arm $65^a$ is mounted loosely on the bush and between the ring 65 and the bearing another loose ring 66 is provided, with which a forked part $68^a$ of a lever 68 engages by means of lateral pins 67 which lever is pivoted at 69 and the other arm $68^b$ of which is pivoted at 70 to a link 71, which is pivoted at its other end by means of a bolt 72 to one arm $73^a$ of a lever 73, which is pivoted at 74. From the free end of the lever 73, a tension member 75 extends through a bent pipe 76 fixed along one of the frame members $4^a$ to a lever 78 pivoted at 77. As will be seen from Figs. 3 and 10 the arm $65^a$ is connected to the guide 26 by a bar 79, which engages the arm $65^a$ at 81 and the guide 26 at 80. The points 10, 25, 80, 81 form the corners of a parallelogram. Consequently, when the arm $65^a$ is allowed to move with the arm 24, with the motor 34 and the guide 26, on these parts being swung round, the arm 38 with the tube 40 will move in such a manner that, if for instance the central ray of the tube passes through the axis of rotation 10, 11 in any position, it will continue to intersect this axis on continuing to move further, while on the other hand, when the ring 66, which is prevented from turning by its being mounted in the fork $68^a$, is pressed against the ring 65 by actuating the lever 78 by means of the pull member passing through the tube 76 and the rodwork 73, $73^a$, 71, $68^b$, $68^a$, the ring 65 is also arrested by the brake action thus exerted, so that the arm $65^a$, even when the arm 24 is turned, retains the position, which it occupies at the moment the brake is applied and that consequently, on the arm 24 with the guide 26 being swung round, the latter performs a parallel motion, the result being that, when moved along over the surface of the body, the rays emanating from the X-ray tube always remain parallel to themselves. Hence, as the screen also performs a parallel motion and is always diametrically opposite the tube, parallel rays can be caused to pass through the body of the patient lying on the table over its entire width.

For laying the patient on the table the procedure is as follows:—

The table 14 is set horizontally in the transverse direction, as shown in Fig 1, whereupon the whole apparatus is tilted by means of the worm gear 7, 5, by starting the motor 9, the frame members 4 rolling on the rollers 2, 2' into the position shown in Fig. 2, in which the table 14 is vertical. Thereupon the ring 28 is opened, by turning the hinged part $28^c$ about the pivot $28^b$, and the supporting arm 38 with the screen holder 41 is turned to one side so that free access is obtained to the table from the right (Fig. 2). The patient then stands with his back against the table on the suitably adjusted foot-rest 15 and is strapped on to the table by means of the girth 17. Thereupon the ring 28 is again closed by hinging down the part $28^c$. The apparatus with the patient can then be brought into any required position for the purpose of diagnosis, the worm gear 5, 7 together with the frame members $4^a$ enabling the table to be tilted in the longitudinal direction and the worm gear 20, 21 enabling the table 14 to be tilted in the transverse direction. The X-ray tube and the screen can be moved completely round the patient, when the latter is in any position owing to their being mounted on the freely moving arm 24 and the ring 28 also being rotatable, so that the rays may be applied in any direction as required. By means of the motor 34 the tube and screen carrier can be moved in the longitudinal direction of the patient, so that access may be had to any part of the upper part of the body. In order that the tube and screen holder, when in any position, may be caused to perform parallel transveres movements over the body, the arm $65^a$ of the parallelogram 10, 25, 80, 81 can be fixed by means of the brake ring 66, as described above, whereby the screen and the rays of the X-ray tube perform a parallel motion.

The X-ray devices of the apparatus (screen and tube holder with screen and tube) can also be used when suitably adjusted on a patient who is not strapped on the table 14. The arm 24 can be turned out of the position shown in Figs. 1 and 2 through 180°, so that the pins 25, 25′ will be outside and, after the bar 79 has been released either from the guide 26 or from the arm 65ª, the guide 26 with the tube and screen holder 38 can be swung out on the pins 25, 25′ in such a manner that it will occupy the position shown in Fig. 14. The patient can then stand outside the apparatus between the tube and the screen, as shown in Fig. 14, for being X-rayed. In this case the apparatus is used as an ordinary X-ray stand. If the arm 24 is only turned through 90° the apparatus with the table in the horizontal or an inclined position can also be used for X-raying a patient lying next to the apparatus, which is important, when the rays are to be applied to the head or the extremities, which are inaccessible when the patient is lying on the table.

In the constructional form shown in Figs. 15 and 15ª, in place of the curved guide members 4ª of the previous example a complete ring 84 is used. In this ring the gudgeons 10 and 11 of the table 14 are journalled. On the gudgeon 10 the supporting arm 24 for the guide 26 is again mounted, a similarly supporting arm 24′ being mounted on the gudgeon 11. Counterpoises 86, 86′ are provided on the backward extensions of the arms 24, 24′.

It is assumed that the lateral tilting of the table 14 is effected by hand. A special arrangement is required for fixing the table in the position given to it. This arrangement consists of a locking member 88, which slides in guides 87 on the underside of the foot end of the table and to which a number of openings 90 correspond, which are arranged in a circle about the pin 11 in a disc 89 connected to said pin, and at the rear end of which a lever 92 is attached by means of a joint 91, which lever 92 is pivoted at the point 93 on the table 14. The locking member is controlled by a spring 94, which abuts at one end against the left hand guide 87 and at the other end against a collar fixed on the said locking member, so that the locking member is kept automatically by the spring in the locking position in engagement with the opening 90.

The ring 84 rests on the rollers 96, 96′, 97, 97′ which are journalled in two angle frames 98, 99 and 98′, 99′. These angle frames each consist of two arms 98 and 99, 98′ and 99′ respectively, which are pivoted on a common pin 100 and 100′ respectively. These pins are mounted in bearings 101 and 101′ on a bed plate 102 and are connected together by tension members 103 and 103′. The tension members are attached at one end to pivotally mounted bearings 104 and 104′ on the arms 98 and 98′, in which they are free to turn and in the neighborhood of the other end engage by means of a threaded part in nuts 105, 105′, which are rotatably mounted at 106, 106′ on the arms 99, 99′. The outer ends of the members 103, 103′ are provided with cranks 107 and 107′ by means of which they can be turned for the purpose of varying the angle between the arms 98, 99 and 98′, 99′. With the parts in the position shown the angle between the arms of the frames is at its greatest. Consequently the ring 84 is in a relatively low position. When the members 103, 103′ are turned in such a manner that the angle between the arms is reduced, this results in a corresponding raising of the arms 98, 98′ with the rollers 96, 96′, as the arms 99, 99′ can only slightly alter their position, so that the ring 84 will also be raised and the table 14 with the patient will be raised correspondingly.

The guiding roller 97 is provided with gear teeth, which mesh in a rack 85 on the ring 84 and on the shaft 111 of which a crank 112 is mounted. By this means the ring 84 can be turned about its axis for the purpose of tilting the table 14 longitudinally.

In this apparatus the screen and tube holder 38 can of course be slid longitudinally along the guide 26 by motor power, as shown in Fig. 1. As this is not done means had to be provided for balancing the weight of the parts on the guide 26, when the latter is not in the horizontal position. For this purpose pulling means 115 are provided, which are guided on rollers 113, 113′ mounted in downwardly extending projections 114, 114′ on the guide 26, which pulling means are attached on the one hand to the sliding part at 116 and on the other hand comprise a counterpoise 117, the weight of which is such that it balances the sliding part and the parts mounted thereon, when the guide 26 is vertical.

The constructional form shown in Fig. 16 is similar to that shown in Fig. 15 in so far as a ring is again provided. In this case, however, the ring 118 is elliptical. This has the following advantages:—When the ring is circular, as in Fig. 15, its diameter is determined by the length of the table 14, which must be at least 2 meters, so that the diameter of the ring must be more than 2 meters. When the gudgeons 10 and 11 of the table are journalled in a diameter of the ring, the table will be more than 1 meter above the ground, when in the horizontal position. If, on the other hand the ring is made elliptical and the table is mounted in the major axis of the ellipse, the said table will be nearer the ground, when in the horizontal position, by an amount corresponding to the difference between the minor axis and the major axis of the ellipse.

In Fig. 16 the table is replaced by a hammock 119. For raising and lowering the ring the same means are used as in Fig. 15, but special means are provided for turning the hammock, which is necessitated by the fact that, owing to the give in the hammock, the hammock must be turned simultaneously at the head end and foot end. For this purpose a lever 121 is provided on the ring 118 at 120, which can be fixed in any position by means of a locking member 122 on a toothed sector 123. The lever 121 is provided with a longitudinal slot 124, in which a pin 125 on a cranked part 126ᵃ of a bar 126 engages. The bar 126 is formed by racks 126ᵇ, 126ᶜ respectively at either end. The end portions of the hammock are provided with toothed wheels 127, 127′ for meshing with the said racks. The rack 126ᵇ lies behind the toothed wheel 127 and the rack 126ᶜ in front of the toothed wheel 127′. On the lever 121 being, for instance, turned to the left, the two racks will turn the toothed wheels in such a manner that they move forward at the top. The reverse rotation is obtained by moving the lever 121 to the right. The two ends of the hammock thus turn in the same direction.

Of the rings 84 and 118 shown in Figs. 15 and 16 one each may be provided or two each at a certain lateral distance apart. In the latter case it is of course necessary to provide suitable double guiding rollers 96, 97 and 96′ and 97′, which are preferably journalled in corresponding double angle frames. When single rings are used, they must be supported laterally to prevent them tilting over. Such a support may for instance be provided by rollers 128, as indicated in Fig. 15. The ring 84 or 118 may, however, also be mounted on a fork 129, which is at right angles to the plane of the said ring, as shown diagrammatically in Fig. 17, the said fork being mounted on a pin 130 in a bearing 131, which is either mounted on a pedestal 135 or in a solid wall. In this case the bearing is only accessible from one side, but this is sufficient for all practical purposes as the X-ray devices can always be so adjusted that the screen is on the unobstructed side.

When the fork 129 and the means for mounting it are made sufficiently strong, the ring 84 may be entirely dispensed with. The whole device is then suspended freely in the air, which has certain advantages, in that the absence of the supporting means makes the apparatus more accessible and facilitates its manipulation.

In Fig. 16 the lever 121 obstructs the free passage for the guide 26 together with the X-ray tube mounted thereon, so that a full rotation of the transradiating means is not possible. To overcome this disadvantage the lever may be given the position shown in Figs. 18 and 19, where it is arranged transversely to the ring 126. With this construction there is no obstruction within the ring and therefore the transradiating means may perform a full rotation.

I claim:—

1. A rotatable bed for X-ray transradiation comprising a couch for the patient, means supporting said couch for rotation about a longitudinal axis, means supporting said couch for tilting about a transverse axis, means for transradiating the patient placed on the couch, and means permitting said transradiating means to rotate around said couch regardless of the position of said couch.

2. A rotatable bed for X-ray transradiation, comprising a couch for the patient, means supporting said couch for rotation about a longitudinal axis, a curved guide member supporting said means for tilting movement of said couch about a transverse axis, and means for transradiating the patient placed on the couch.

3. A rotatable bed for X-ray transradiation according to claim 2, having said curved guide member connected with said couch and means supporting said guide member.

4. A rotatable bed for X-ray transradiation according to claim 2, further comprising supports for the revolving couch mounted on said curved guiding member.

5. A rotatable bed for X-ray transradiation according to claim 2, further comprising supports for the revolving couch mounted on said curved guiding member, said curved guide member being connected with said couch, and means supporting said guide member.

6. A rotatable bed for X-ray transradiation according to claim 2, further comprising a stationary frame, guiding means in said frame, said curved guide member of the couch being guided by said guiding means.

7. A rotatable bed for X-ray transradiation, comprising a couch, means supporting said couch for rotation about a longitudinal axis, a curved guide member supporting said means, a stationary frame, guide rollers for said curved guide member, mounted in said frame, and transradiating means.

8. A rotatable bed for X-ray transradiation, comprising a couch, means supporting said couch for rotation about a longitudinal axis, a curved guide member supporting said means, a stationary frame, guiding means in said frame for said curved guide member, and means for tilting the couch by moving the curved guiding member upon said guiding means.

9. A rotatable bed for X-ray transradiation, comprising a couch, means for revolubly supporting said couch in a longitudinal axis, means for tilting said supporting means about a transverse axis, a worm wheel coaxially connected to said couch, a worm meshing with said worm wheel and mounted in said supporting means, and transradiating means.

10. A rotatable bed for X-ray transradiation according to claim 2, said curved guide member being a complete annulus.

11. A rotatable bed for X-ray transradiation according to claim 2, said curved guide member being an eccentric annulus.

12. A rotatable bed for X-ray transradiation, comprising a couch, means supporting said couch for rotation about a longitudinal axis, a plurality of parallel curved guide members allowing the tilting of said couch about a transverse axis, and transradiating means.

13. A rotatable bed for X-ray transradiation according to claim 2, comprising further a fork connected to said curved guide and means for rotatably mounting said fork in the axis of rotation of said curved member.

14. A rotatable bed for X-ray transradiation according to claim 2, comprising further a fork connected to said curved guide, a pin on said fork arranged in the center axis of said curved guide, and a stationary bearing receiving said pin.

15. A rotatable bed for X-ray transradiation, comprising a couch, means supporting said couch for rotation about a longitudinal axis, a support for said means tiltable about a transverse axis, and transradiating means revoluble about a longitudinal axis mounted on said tiltable support.

16. A rotatable bed for X-ray transradiation according to claim 15, the axis of rotation of the transradiating means coinciding with the axis of rotation of the couch.

17. A rotatable bed for X-ray transradiation according to claim 15, said transradiating means being revolubly mounted about the longitudinal axis of rotation of said couch.

18. A rotatable bed for X-ray transradiation according to claim 2, said transradiating means being revolubly mounted about the longitudinal axis of rotation of said couch and within said curved guide.

19. A rotatable bed for X-ray transradiation, comprising a couch, means supporting said couch for rotation about a longitudinal axis, a support for said means tiltable about a transverse axis, a revoluble supporting arm mounted upon said longitudinal axis of rotation, a guide supported by said arm and substantially parallel to said couch, a slide longitudinally movable along said guide, and transradiating means supported by said slide.

20. A rotatable bed for X-ray transradiation according to claim 19, an arm mounted on said slide and supporting the transradiating means.

21. A rotatable bed for X-ray transradiation according to claim 19, an arm supporting the transradiating means being arranged at one side of the slide and of the couch.

22. A rotatable bed for X-ray transradiation according to claim 19, an arm supporting the transradiating means being connected to the slide by a pin permitting same to tilt in the longitudinal direction.

23. A rotatable bed for X-ray transradiation according to claim 19, further comprising means to move said slide along said guide.

24. A rotatable bed for X-ray transradiation according to claim 19, a screw spindle longitudinally mounted on said guide, a nut on said spindle mounted on said slide and means for driving said spindle.

25. A rotatable bed for X-ray transradiation according to claim 19 a screw spindle longitudinally mounted on said guide, a nut on said spindle mounted on said slide, a toothed wheel on said spindle, a driving gear meshing therewith, a belt pulley on the axis of the driving gear, an electric motor and a belt connecting said motor to said pulley, said motor being supported by the revoluble arm.

26. A rotatable bed for X-ray transradiation according to claim 19, said guide being rockingly suspended to said arm in a longitudinal axis.

27. A rotatable bed for X-ray transradiation according to claim 19, said guide being rockingly suspended to said arm in a longitudinal axis arranged at a distance of the guide, a bracket on said guide suspended to said axis, a gear and a belt pulley on said axis.

28. A rotatable bed for X-ray transradiation, comprising a couch, means supporting said couch for rotation about a longitudinal axis, a support for said means tiltable about a transverse axis, a rotatable support mounted upon said longitudinal axis of rotation, a longitudinally extending guide carried by said arm near one end, a ring supporting said guide near its other end and surrounding the couch, means for supporting said ring, said means being mounted on the tilting support for the revoluble couch, and transradiation means movable along said guide.

29. A rotatable bed for X-ray transradiation according to claim 28, said ring supporting means being rollers.

30. A rotatable bed for X-ray transradiation according to claim 28, said ring being of sufficient width to freely surround the revoluble couch and the patient placed thereon.

31. A rotatable bed for X-ray transradiation according to claim 28, said ring comprising a hinged portion capable of being turned to open the ring for making the couch accessible.

32. A rotatable bed for X-ray transradiation, comprising a couch, means supporting said couch for rotation about a longitudinal axis, a support for said means tiltable about a transverse axis, a support revoluble about a longitudinal axis in said tiltable support, transradiating means being revolubly mounted on said revoluble support upon a longitudinal axis, and guiding means for producing a parallel movement of said transradiating means when their support is rotated.

33. A rotatable bed for X-ray transradiation according to claim 32, having a tiltable support for said transradiating means carried by said revoluble support, said guiding means consisting of a parallelogram having one side fixed to said tiltable support for the transradiating means, the opposite side being loosely mounted upon the axis of rotation of said transradiating means, and means for fixing said side in any position.

34. A rotatable bed for X-ray transradiation according to claim 32, comprising further a tiltable guide for said transradiating means carried by said revoluble support, an arm freely mounted on the longitudinal axis of rotation of said rotatable couch, a rod connecting said arm with the tiltable guide, the said arm and rod forming a parallelogram together with the lines connecting the center of rotation of the tilting guide with the center of rotation of the revoluble support and the point of connection of the rod to the said guide, and means for fixing the said arm in any position.

35. A rotatable bed for X-ray transradiation, comprising a couch means supporting said couch for rotation about a longitudinal axis, a support for said means tiltable about a transverse axis, a support for transradiating means revoluble about a longitudinal axis in said tiltable support, a tiltable guide mounted on a longitudinal axis in said support, transradiating means supported by said guide, an arm freely mounted on the longitudinal axis of rotation of said couch, a rod connecting said arm with the tiltable guide, the said arm and rod forming a parallelogram together with the lines connecting the center of rotation of the tilting guide with the center of rotation of the supporting arm and the point of connection of the rod to the said guide, and a fixing clutch device acting upon the said arm.

36. A rotatable bed for X-ray transradiation according to claim 35, said clutch device consisting of a clutch ring, a lever connected to said clutch ring, and a clutch member connected to said arm and cooperating with said clutch ring.

37. A rotatable bed for X-ray transradiation according to claim 19, further comprising means to move said slide along said guide, said means comprising an electric motor mounted at the opposite end of the rotatable supporting arm to form counterweight.

38. A rotatable bed for X-ray transradiation according to claim 2, having adjustable means for supporting the curved guide member.

39. A rotatable bed for X-ray transradiation according to claim 2, said curved guide member being supported by angle frames having supporting rollers at the shanks and means for adjusting their angle.

40. A rotatable bed for X-ray transradiation according to claim 2, said curved guide member being supported by pivotal angle frames having supporting rollers at the shanks and means for adjusting their angle.

41. A rotatable bed for X-ray transradiation according to claim 32, comprising further a tiltable guide for said transradiating means carried by said revoluble support, an arm freely mounted on the longitudinal axis of rotation of said rotatable couch, a rod connecting said arm with the tiltable guide, the said arm and rod forming a parallelogram together with the lines connecting the center of rotation of the tilting guide with the center of rotation of the revoluble support and the point of connection of the rod to the said guide, and means for fixing the said arm in any position, said rod being detachable from one of the elements connected therewith.

42. A rotatable bed for X-ray transradiation, comprising a couch rotatable about a longitudinal axis, means for rotating said couch upon said axis, means for tilting said couch upon a transverse axis, and transradiating means.

In testimony whereof I affix my signature.

ERNST POHL.